(12) United States Patent
Hick (10) Patent No.: US 12,077,035 B2
(45) Date of Patent: Sep. 3, 2024

(54) WINDOW UNIT COMPRISING A GLAZING PANEL AND A FRAME

(71) Applicant: AGC GLASS EUROPE, Louvain-la-Neuve (BE)

(72) Inventor: Robert Hick, Chenee (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 9 days.

(21) Appl. No.: 17/786,409

(22) PCT Filed: Dec. 18, 2020

(86) PCT No.: PCT/EP2020/087078
§ 371 (c)(1),
(2) Date: Jun. 16, 2022

(87) PCT Pub. No.: WO2021/123207
PCT Pub. Date: Jun. 24, 2021

(65) Prior Publication Data
US 2023/0014125 A1    Jan. 19, 2023

(30) Foreign Application Priority Data
Dec. 19, 2019  (EP) .................................. 19217818

(51) Int. Cl.
*B32B 3/10* (2006.01)
*B32B 17/10* (2006.01)
*B60J 1/00* (2006.01)
*B60J 1/20* (2006.01)
*B29C 45/14* (2006.01)
*B29K 23/00* (2006.01)
*B29K 709/08* (2006.01)
*B29L 31/00* (2006.01)

(52) U.S. Cl.
CPC ......... *B60J 1/001* (2013.01); *B32B 17/10036* (2013.01); *B32B 17/10761* (2013.01); *B32B 17/10788* (2013.01); *B60J 1/20* (2013.01); *B29C 45/14434* (2013.01); *B29K 2023/12* (2013.01); *B29K 2709/08* (2013.01); *B29L 2031/7782* (2013.01); *B32B 2605/006* (2013.01)

(58) Field of Classification Search
None
See application file for complete search history.

(56) References Cited

U.S. PATENT DOCUMENTS

2008/0319133 A1    12/2008  MacLachlan
2009/0304970 A1*   12/2009  Imaizumi .............. B29C 45/062
                                                          428/38

FOREIGN PATENT DOCUMENTS

EP    2 062 713 A1    5/2009

OTHER PUBLICATIONS

International Search Report issued Apr. 9, 2021 in PCT/EP2020/087078 filed Dec. 18, 2020, (3 pages).

* cited by examiner

*Primary Examiner* — Christopher M Polley
(74) *Attorney, Agent, or Firm* — Oblon, McClelland, Maier & Neustadt, L.L.P.

(57) ABSTRACT

A window unit including a glazing panel, a frame which has a frame profile and encompasses the edge of the glazing panel on at least one peripheral side and includes a plastic primary part, with the primary part having at least 10% in weight of recycled material.

18 Claims, 8 Drawing Sheets

WINDOW UNIT COMPRISING A GLAZING PANEL AND A FRAME

TECHNICAL FIELD

The present invention relates to a window unit comprising a glazing panel, a frame, which has a frame profile and encompasses the edge of the glazing panel on at least one peripheral side and comprises a plastic primary part.

BACKGROUND ART

Window unit with a glazing panel and a frame is known. To manufacture a frame which runs around the window, a primer or adhesive is applied in the edge region of the window on an inner side, a face side and an outer side before a primary part is moulded onto the edge region of the peripheral side of the glass panel.

Nowadays, in vehicle industries, the total amount of materials used to overmold window unit is quite high. Depending of the car, we could estimate a weight range of about 300 to 1000 gr per vehicle. This represents then a large amount of virgin material used to produce this encapsulated window unit. This is then highly resource consuming.

It is know that the management of plastic waste and plastic resources are globally a worldwide issue. Plastic pollution is became a challenge that every country has to deal with.

Ingestion of micro-particles of plastic, pollution of our seas, existence of plastics trash gyres, . . . are some of the examples linked to this problematic knowing that globally, the plastic consumption is still growing causing at mid and long term problem to our environment and so to our human society.

Nowadays, plastic waste can be managed in three different ways: recycling, energy recovery and landfill. Depending of the region of the world, the split between these three categories is different. Landfill should be minimize in order to reduce bad footprint impact in our environment.

According to ISO 14021 standard, recycled material are coming either from pre-consumer, meaning waste coming from a manufacturing process other than the one use to produce the part, or from post-consumer material, meaning the reuse of material coming from product after end-of-life.

It is known that, pre-consumer materials have better quality level compared to post-consumer materials. It is generally one component material for which it is easier to have an information about the product origin and characteristics. Impact on material characteristics still exists even if the impact is less.

SUMMARY OF INVENTION

It is an object of the present invention to alleviate these problems, and to provide a window unit with a frame with a reduced environment footprint while minimizing landfilling and while reducing the negative impact of plastic use.

According to a first aspect of the invention, the invention relates to an improved window unit comprising a glazing panel, a frame which has a frame profile and encompasses the edge of the glazing panel on at least one peripheral side and comprises a plastic primary part.

The solution as defined in the first aspect of the present invention is based on the primary part comprises at least 10% in weight of recycled material of the total polymeric material of the primary part. The said recycled material has the same polymeric base than the virgin material of the primary part.

Correct management of the plastic waste, appropriate sorting and mix of recycled and virgin material can decrease or anneal disadvantages mentioned in the background art. This is a common use to mix virgin and recycled material. Cold runner and sprue are example of regrinded material directly reuse in standard production. Regarding ISO norm cited here above, this regrind material is not considered as recycled material.

According to the norm, a Mobius loop with the value of the percentage in weight written inside the loop, can be placed as a logo on the window unit to prove the recycle level of the specific element of the window unit especially the frame. Then, verification of the source and quantity of the recycled materials may be carried out through the used logo and/or the use of purchasing documentation and other available records.

On the other hand, using of recycled thermoplastics has also some drawback: negative impact on the characteristics of the material regrinded (lower mechanical resistance), deterioration of the surface aspect quality, viscosity increase, material characteristics range increase, potential presence of hazardous materials linked to bad sorting, . . . .

An increase of the quantity of recycled plastic can imply a decrease of energy recovery and/or landfill management, saving of virgin material consumption, development of new technologies and new jobs in order to increase the level of plastic that can be reuse after end of life, giving a greener image to the company using these materials, . . . .

More particularly, the present invention is to use recycled materials within a certain level allowing an important reduction of virgin material consumption.

In some embodiments, the frame which has a frame profile and encompasses the edge of the glazing panel on at least two peripheral sides and comprises a plastic primary part The primary part can be overmolded on the glazing panel meaning that the primary part is created before, placed in a mold with the glazing panel and then fixed to the glazing panel with another material such as a secondary part. To facilitate the process, the primary part can be injected into a mold to be encapsulated directly on the glazing panel. In some other embodiments the primary part can me created before and then fixed to the glazing panel by a fixing means such as glue.

Alternatively, the primary parts in the form of a hard component.

Hard materials are sometimes use to bring some more stiffness to the part, reduce soft material thickness and/or add function to the encapsulated window unit: guide integrated to rear door fix, fixation use to assemble the window unit to a car body, . . . . Hard material can be polypropylene (PP), polycarbonate (PC) based blend, acrylic based blend, polyamide or other. In preferred embodiments, the hard material is not visible after assembly of the encapsulated window unit on the car. The hard material, which could be also filled with filler as glass fiber, ball glass, talc, etc. are covered with the soft material after an overmolding process. In a preferred embodiment, the hard component is a polypropylene based material. Other hard materials, with a young modulus higher than 1000 MPa, as polyamide, styrenic and others can be also used.

Alternatively, in order to reinforce the primary part, the primary part comprises glass fibers mixed with the hard material.

Alternatively, the primary part is in the form of a soft component. The soft component can be a thermoplastic elastomer based material. Styrenic based and vulcanized thermoplastics elastomer are generally used. The soft component is in another embodiment a soft polyvinyl chloride. The soft material is used to give the final surface aspect of the frame and also to fit the window unit to the car body. Effectively, the softness of the material allow interferences between the carbody and the window unit by the use of soft lips. Soft material is sometimes also used to insure a sealing function between the carbody and the encapsulated window unit.

In some embodiments of the invention, the frame comprises a secondary part which is in the form of soft component, placed at least partially over the primary part. The secondary part allows to thigh the window unit on the structure where it is fixed. Such structure can be a car body, a building, . . . .

The secondary part can be injected in a second step over at least partially the primary part. Preferably, the secondary part is a single part. In some embodiments, the secondary part can be locally in contact with the glazing panel to ensure the aesthetic and the tightness of the window unit.

In some embodiments, at least a portion of the secondary part is in contact with the glazing panel.

In preferred embodiments, the soft component is a thermoplastic elastomer based material. Styrenic based and vulcanized thermoplastics elastomer are generally used. The soft component is in another embodiment a soft polyvinyl chloride.

In some embodiments, the soft component of the primary part and/or the secondary part can be a thermoplastic elastomer based material. In some embodiments, the soft component of the primary part and/or the secondary part can be a PMMA based material.

In some embodiments, the primary part is in direct contact with the glazing panel.

The glazing panel can be a flat or curved panel to fit with the design of the car. The glazing panel can be processed, i.e. annealed, tempered, . . . to respect with the specifications of security and anti-thief requirements. A heatable system, for example a coating or a network of wires, can be applied on the glazing panel to add a defrosting and/or a demisting function for example.

In some embodiments of the invention, the primary part is in direct contact with the glazing panel meaning that the primary part is injected on the glazing panel. The glazing panel can have locally a bonding agent or primer material to ensure tightness and/or to promote the encapsulation of the primary part on the glazing panel.

The primary part can be overmolded on the glazing panel. To facilitate the process, the primary part can be injected into a mold to be encapsulated on the glazing panel.

In some embodiments, the glazing panel is a glass panel. The glass panel comprises at least one glass sheet.

Alternatively, the glazing panel can be a laminated glass panel. The laminated glazing comprises glass sheets maintained by one or more interlayers positioned between glass sheets. The interlayers employed are typically polyvinyl butyral (PVB) or ethylene-vinyl acetate (EVA) for which the stiffness can be tuned. These interlayers keep the glass sheets bonded together even when broken in such a way that they prevent the glass from breaking up into large sharp pieces.

The glass sheet can be a clear glass or a coloured glass, tinted with a specific composition of the glass or by applying a coating or a plastic layer for example.

In embodiments where the glazing panel is a laminated glass panel, it could be advantageous to have varying thicknesses of glass sheets to reduce weight and noise. Due to of induced deformations on the glazing panel, thin glass sheets with a thickness less than 1 mm can be used without be bent or deformed. Thus, such thin glass sheet can keep the desired design.

In some embodiments, the primary part can comprises a core part. The core part can be in direct contact with the glazing panel meaning the core part is injected on the glazing panel. The glazing panel can have locally a bonding agent or primer material to ensure tightness and/or to promote the encapsulation of the core part on the glazing panel. The core part can be can be overmolded on the glazing panel meaning that the core part is created before, placed in a mold with the glazing panel and then fixed to the glazing panel with another material such as a surrounding part. To facilitate the process, the core part can be injected into a mold to be encapsulated on the glazing panel. To facilitate the process, the core part can be injected into a mold to be encapsulated on the glazing panel. In some other embodiments the core part can me created before and then fixed to the glazing panel by a fixing means such as a glue.

In these embodiments, the primary part comprises two parts, a core part and a surrounding part, the surrounding part is placed at least partially over the core part. The surrounding part can be locally in direct contact with the glazing panel meaning the surrounding part is injected on the glazing panel at least partially over the core part. The glazing panel can have locally a bonding agent or primer material to ensure tightness and/or to promote the encapsulation of the surrounding part on the glazing panel.

A method to produce a window unit according these embodiments comprising the following steps:
1. the glass panel and the said core part are inserted into a mold,
2. the mold is closed creating at least one cavity around the glass panel and/or around the core part,
3. The surrounding part of the primary part is injected in the at least one cavity,
4. The mold is opened,
5. The window unit is removed from the mold.

In these embodiments, the frame can comprises a secondary part as described below. The secondary part is injected after the surrounding part.

In some embodiments, the composition of the core part of the primary part comprises a higher percentage (rate) of recycled material in weight of recycled material of the total polymeric material of the core part than the percentage in weight of recycled material of the total polymeric material of the surrounding part. The percentage in weight of the recycled material of the primary part is the total weight of recycled material of the core part and the surrounding part divided by the total in weight of the sum of virgin and recycled material of the core part and the surrounding part multiplied by 100.

In some embodiments, the frame can comprise a decorative element, the said decorative element is attached to the primary part of the frame or to a secondary part.

The invention relates also to a method to produce the window unit according to the present invention comprising the following steps:
1. the glass panel is inserted into a mold,
2. the mold is closed creating at least one cavity around the glass panel, 3. The primary part is injected in the at least one cavity,
4. The mold is opened
5. The window unit is removed from the mold.

In some embodiments, a secondary part can be injected after the injection of the primary part.

In some embodiments, the primary part is not injected on the glazing panel but can be placed with the glazing panel in the mold and overmolded by a secondary part.

The window unit of the present invention may be arranged in opening in a car body, in a window frame or a door frame.

It is noted that the invention relates to all possible combinations of features recited in the claims.

The following description relates to an automotive window unit but it's understood that the invention may be applicable to others fields like transportation vehicle such as trains, bus, boats, . . . or like architectural windows which may provide an encapsulation surrounding the edge of the window on at least one peripheral side.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DESCRIPTION OF EMBODIMENTS

The examples provided herein are illustrative of the scope of the invention defined in the claims. They do not in any way, represent limitative embodiments of the invention. It is noted that the invention relates to all possible combinations of features recited in the following embodiments.

Figure 1A:
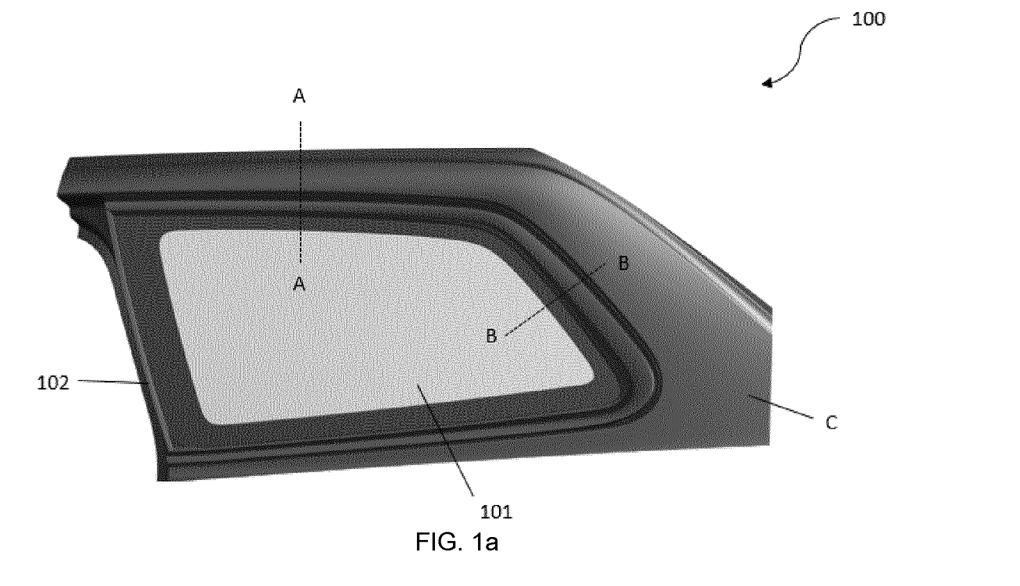
FIG. 1a is a schematic view of a window unit placed in a carbody according to an exemplifying embodiment of the present invention.
Figure 1B:
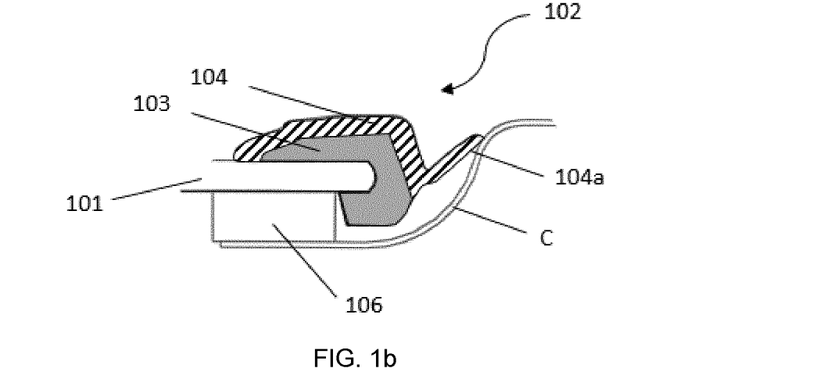
FIG. 1b is a cross section according to FIG. 1a section A-A.
Figure 1C:
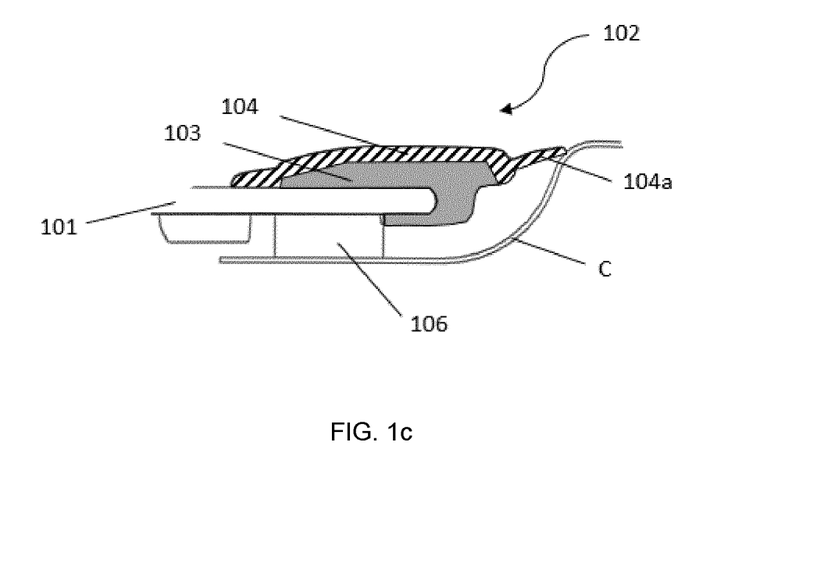
FIG. 1c is a cross section according to FIG. 1a section B-B.

With reference to FIGS. 1a-1c, a first embodiment of the present invention is described.

FIGS. 1a, 1b and 1c shows a window unit 100 comprising a glazing panel 101, a frame 102 which has a frame profile and encompasses the edge of the glazing panel 101. The primary part 103 is injected directly on the glass panel beforehand placed in a mold. Primary part comprises at least 10% in weight of recycled material meaning that the polymeric base of the primary part comprises at least 10% in weight of recycled material of the total polymeric material of the primary part and at most 90% of virgin material. The primary part which is in the form of a hard component comprises a polypropylene based virgin material. The recycled material is a polypropylene based material meaning that the recycled material has the same polymeric base than the virgin material of the primary part.

The window unit 100 has a polygonal shape and particularly a trapezoidal-shape. The glazing panel 101 has slightly the same shape. The frame which has a frame profile and encompasses the edge of the glazing panel on the four peripheral sides.

In these embodiments, the primary part comprises at least 50% in weight up to 100% in weight of recycled material. In this embodiment, a percentage of polypropylene is between 50% in weight and 70% in weight of recycled materials. Advantageously, as the most of the primary part is not visible, the polymeric material of the primary part can have a higher percentage in weight of recycled material.

The primary part can comprises other material such as and glass fibers to reinforce the primary part.

The frame comprises also a secondary part 104. The secondary part 104 is a TPE based material. In some embodiments, the polymeric material of the secondary part has a lower percentage of recycled material than the percentage of recycled material of the primary part.

In some embodiments, the TPE material may contained some polypropylene, recycled polypropylene can be used too. In these embodiments, as the maximum quantity of polypropylene is about 20-25% in weight, the percentage of recycled material of the secondary part is limited for TPE even if we consider only use on recycled polypropylene.

The glazing panel can comprises fixing means 106 able to fix the window unit 100 to another element like a car body C, a door frame, . . . . Fixing means 106 are fixed on the frame within the primary part 102. In some embodiments, fixing means can be overmolded with the primary part. In some embodiments, fixing means are injected with the primary part. Others fixing means like a division bar can be used.

In some embodiments, the primary part can have specific designs in order to fulfil with requirements and to stiffen the frame and the window unit 100. The secondary part can have a specific design with lips, . . . to tight the window unit 100. As shown in FIGS. 1b and 1c, the frame has a frame profile and encompasses the edge of the glazing panel. The primary part encompass the edge of the glazing panel. The primary part is in contact with the two main surfaces of the glazing panel and with the edge. The secondary part is over at least a part of the primary part. In this embodiment, the secondary part is in contact with the glazing panel on one main surface.

The secondary part comprises a lip 104a allowing the tightness between the window unit and the car body C.

In this embodiment, the window unit is produced by a multicomponent injection molding process. This method comprises the following steps:
1. the glass panel is inserted into a mold,
2. the mold is closed creating at least one cavity around the glass panel,
3. The primary part is injected in the at least one cavity,
4. The glass panel with the primary part is transferred on a second part of the mold with a different cavity,
5. The secondary part is injected on the different cavity,
6. The mold is opened,
7. The window unit is removed from the mold.

As shown in FIGS. 2a-2e, a second embodiment of the present invention is described.

FIGS. 2a, 2b, 2c, 2d and 2e shows a window unit 200 comprising a glazing panel 201, a frame 202 which has a frame profile and encompasses the edge of the glazing panel 201. The primary part is injected on the glass panel beforehand placed in a mold. Primary part comprises at least 10% in weight of recycled material meaning that the polymeric base of the primary part comprises at least 10% in weight of recycled material of the total polymeric material of the primary part and at most 90% of virgin material. The primary part which is in the form of a soft component comprises a TPE based virgin material. The recycled material is a TPE based material meaning that the recycled material has the same polymeric base than the virgin material of the primary art.

Figure 2A:
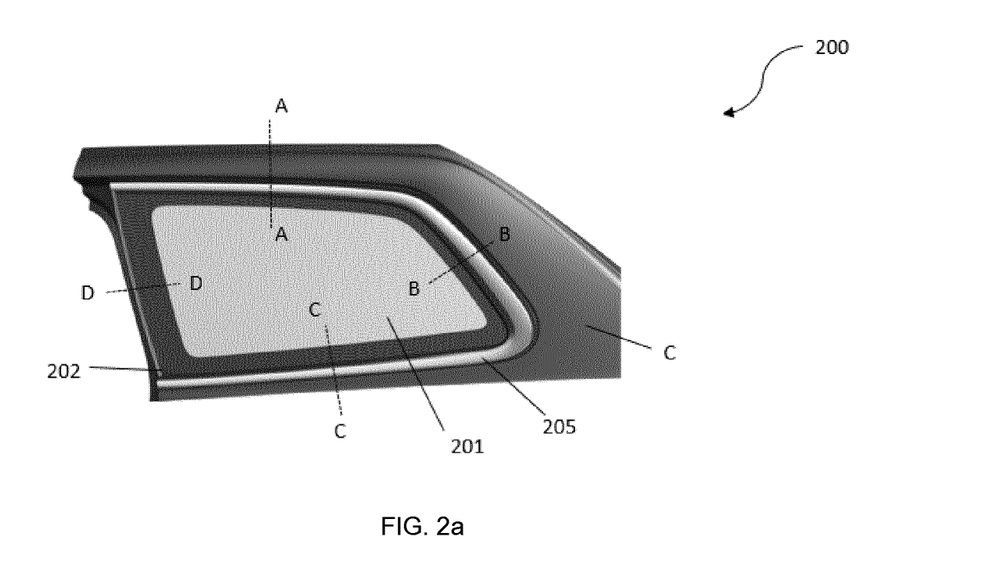
FIG. 2a is a schematic view of a window unit placed in a carbody according to a second exemplifying embodiment of the present invention.
Figure 2B:
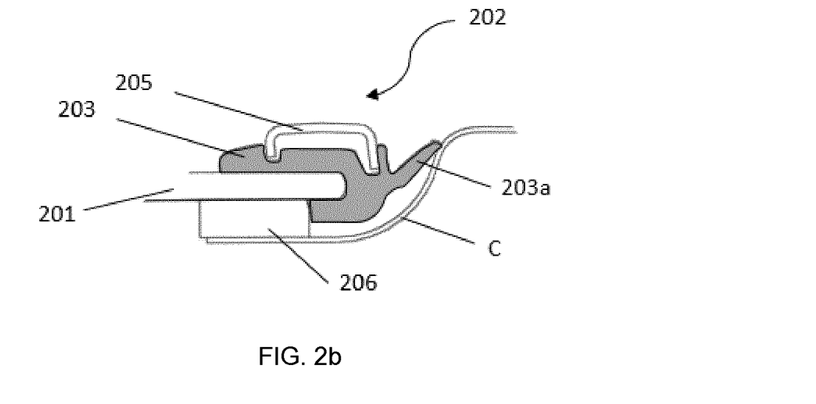
FIG. 2b is a cross section according to FIG. 2a section A-A.
Figure 2C:
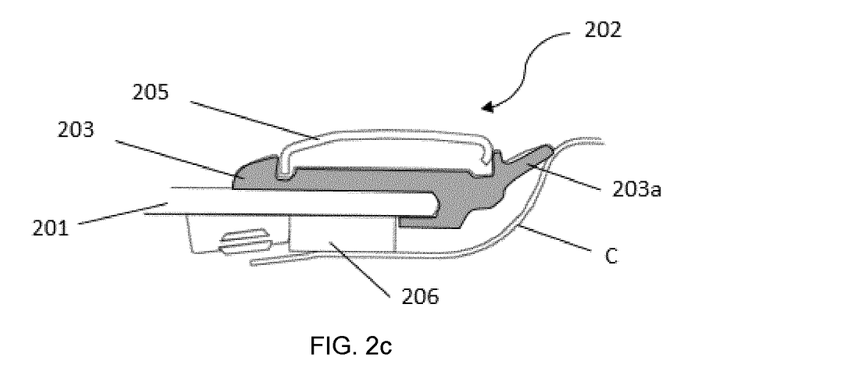
FIG. 2c is a cross section according to FIG. 2a section B-B.
Figure 2D:
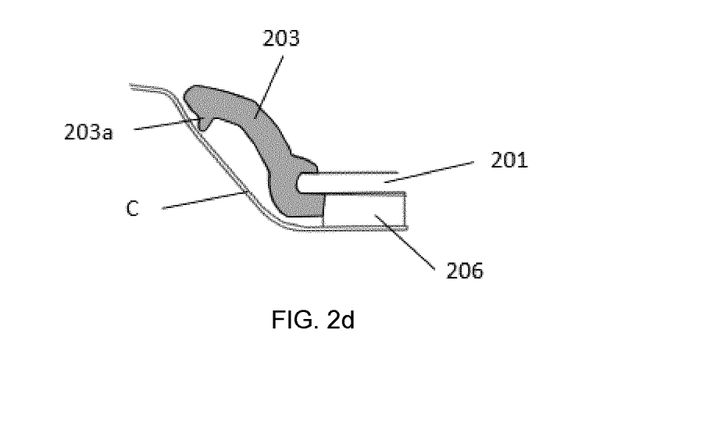
FIG. 2d is a cross section according to FIG. 2a section C-C.
Figure 2E:
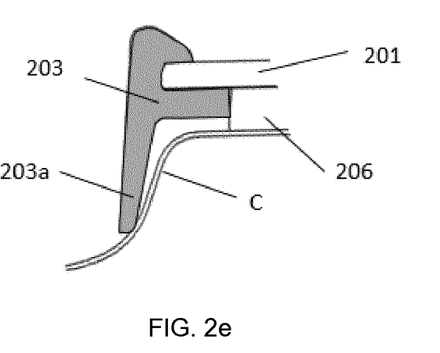
FIG. 2e is a cross section according to FIG. 2a section D-D.

The window unit 200 has a polygonal shape and particularly a trapezoidal-shape. The glazing panel 201 has slightly the same shape. The frame which has a frame profile and encompasses the edge of the glazing panel on the four peripheral sides.

In these embodiments, the primary part comprises at least 50% in weight up to 100% in weight of recycled material. In this embodiment, a percentage of TPE is between 50% in weight and 70% in weight recycled materials. Advantageously, as the most of the primary part is not visible, the polymeric material of the primary part can have a higher percentage in weight of recycled material.

The primary part can comprises other material such as and glass fibers to reinforce the primary part.

The frame comprises also a decorative element 205. The decorative element can be a single element at least partially surrounding the top of the frame as shown in FIG. 2a. In some embodiments, the decorative element can be several pieces fixed to the primary part. The decorative element can cover only a part of the primary part. In this embodiment, the decorative element covers three of the four sides of the window unit.

The decorative element can be made with plastic, metal and with different top aspect such as metallised aspect. The decorative element can be fixed on the primary part by fixing means or can be overmolded with the primary part.

The glazing panel can comprises fixing means 206 able to fix the window unit 200 to another element like a car body C, a door frame, . . . . Fixing means 206 are fixed on the frame within the primary part 202. In some embodiments, fixing means can be overmolded with the primary part. In some embodiments, fixing means are injected with the primary part. Others fixing means like a division bar can be used.

In some embodiments, the primary part can have specific designs in order to fulfil with requirements and to stiffen the frame and the window unit 200. The secondary and/or primary part can have a specific design with lips, . . . to tight the window unit 200. As shown in FIGS. 1b-1e, the frame has a frame profile and encompasses the edge of the glazing panel. The primary part encompass the edge of the glazing panel. The primary part is in contact with the two main surfaces of the glazing panel and with the edge.

The primary part comprises a lip 203a allowing the tightness between the window unit and the car body C.

In this embodiment, the window unit is produced by an injection molding process. This method comprises the following steps:
1. the glass panel is inserted into a mold,
2. the mold is closed creating at least one cavity around the glass panel,
3. The primary part is injected in the at least one cavity,
4. The mold is opened,
5. The window unit is removed from the mold.
6. The decorative element is fixed on the primary part.

The decorative element can also be overmolded by the primary part meaning that the decorative strip is inserted into the mold with the glass panel then the primary part is injected into the at least one cavity instead of being fixed after the injection step.

With reference to FIGS. 3a-3f, a first embodiment of the present invention is described.

FIGS. 3a, 3b, 3c, 3d, 3e and 3f shows a window unit 300 comprising a glazing panel 301, a frame 302 which has a frame profile and encompasses the edge of the glazing panel 301. The primary part is injected on the glass panel beforehand placed in a mold. Primary part comprises at least 10% in weight of recycled material meaning that the polymeric base of the primary part comprises at least 10% in weight of recycled material of the total polymeric material of the primary part and at most 90% of virgin material. The primary part which is in the form of a hard component comprises a polypropylene based virgin material. The recycled material is a polypropylene based material meaning that the recycled material has the same polymeric base than the virgin material of the primary art.

Figure 3A:
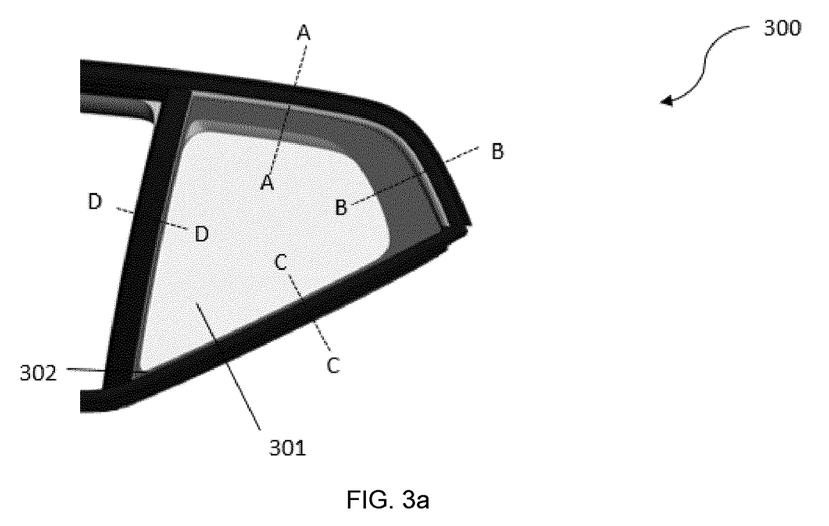
FIG. 3a is a schematic view of a window unit placed in a carbody according to a third exemplifying embodiment of the present invention.

The window unit 300 has a polygonal shape and particularly a trapezoidal-shape. The glazing panel 301 has slightly the same shape. The frame which has a frame profile and encompasses the edge of the glazing panel on the three peripheral sides.

In these embodiments, the primary part comprises at least 50% in weight up to 100% in weight of recycled material. In this embodiment, a percentage of polypropylene is between 50% in weight and 70% in weight of pre-consumer recycled materials. Advantageously, as the most of the primary part is not visible, the polymeric material of the primary part can have a higher percentage in weight of recycled material.

The primary part can comprises other material such as and glass fibers to reinforce the primary part.

The frame comprises also a secondary part. The secondary part is a TPE based material. In some embodiments, the polymeric material of the secondary part has a lower percentage of recycled material than the percentage of recycled material of the primary part.

In some embodiments, the TPE material may contained some polypropylene, recycled polypropylene can be used too. In these embodiments, as the maximum quantity of polypropylene is about 20-25% in weight, the percentage of recycled material of the secondary part is limited for TPE even if we consider only use on recycled polypropylene.

The glazing panel can comprises fixing means 306 able to fix the window unit 300 to another element like a car body C, a door frame, . . . . Fixing means 306 are fixed on the frame within the primary part 302. In some embodiments, fixing means can be overmolded with the primary part. In some embodiments, fixing means are injected with the primary part. Others fixing means like a division bar can be used.

In some embodiments, the primary part can have specific designs in order to fulfil with requirements and to stiffen the frame and the window unit 300. The secondary part can have a specific design with lips, . . . to tight the window unit 300. As shown in FIGS. 1b-1f, the frame has a frame profile and encompasses the edge of the glazing panel. The primary part encompass the edge of the glazing panel. The primary part is in contact with the two main surfaces of the glazing panel and with the edge. The secondary part is over at least a part of the primary part. In this embodiment, the secondary part is in contact with the glazing panel on one main surface.

The primary part and the secondary part have different shape on each side of the glazing unit depending the local need of tightness and fixing.

Figure 3B:
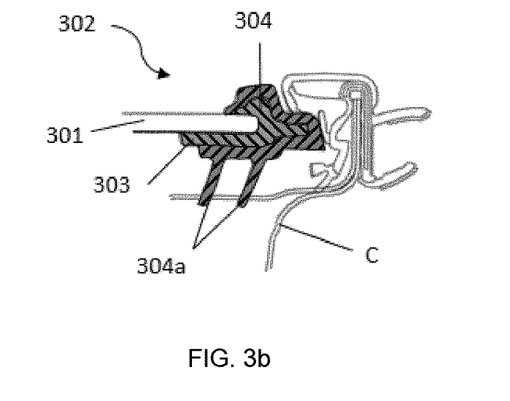
FIG. 3b is a cross section according to FIG. 3a section A-A.
Figure 3C:
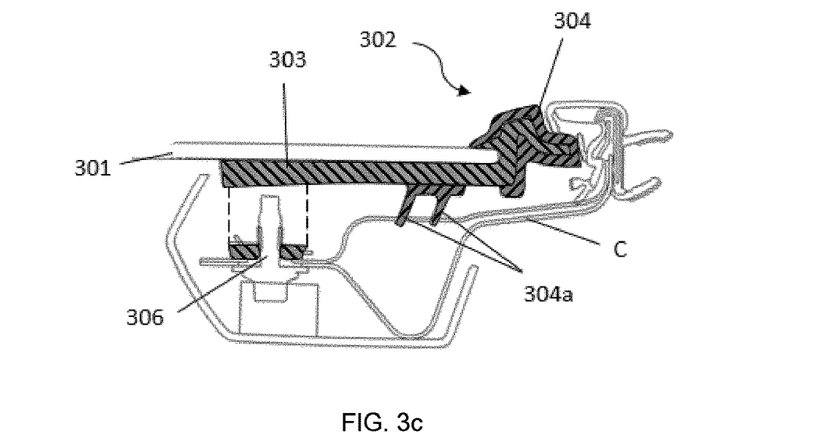
FIG. 3c is a cross section according to FIG. 3a section B-B.
Figure 3D:
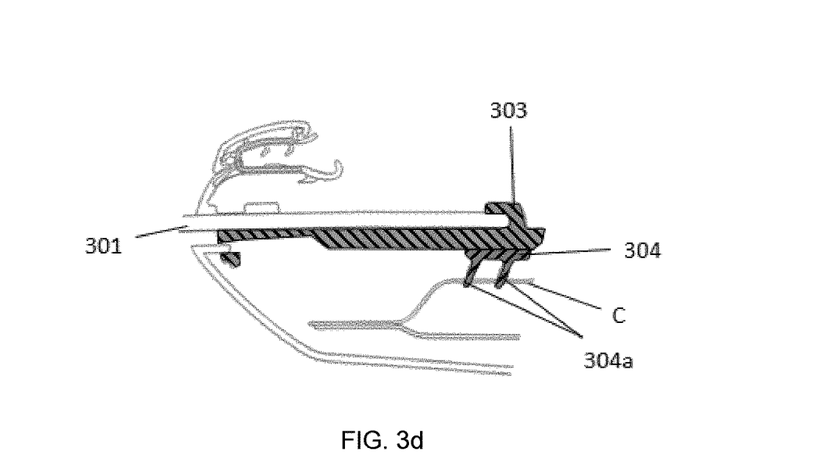
FIG. 3d is a cross section according to FIG. 3a section C-C.
Figure 3E:
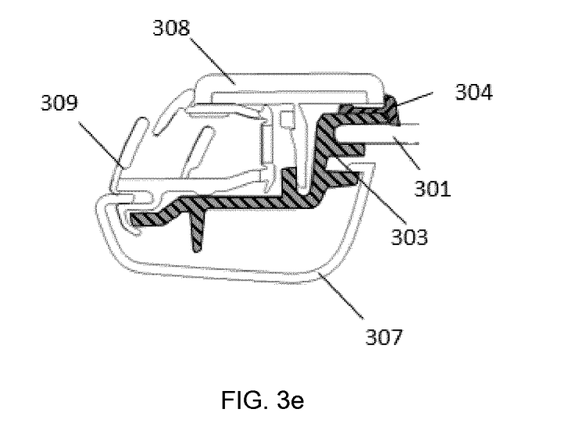
FIG. 3e is a cross section according to FIG. 3a section D-D.

In FIG. 3b, the secondary part encompasses the majority of the surface of the primary part. In FIG. 3c, the secondary part is over a small part of the surface of the primary part. In FIG. 3d, the secondary part is only placed locally to ensure the tightness with the car body C with lips 304a. in FIG. 3e, the secondary part is in direct contact with the glazing panel and locally placed over the primary part to be assembled with a division bar cover 308 allowing a second glazing panel to move inside this so formed U shape division bar having post-attached gasket 309.

Figure 3F:
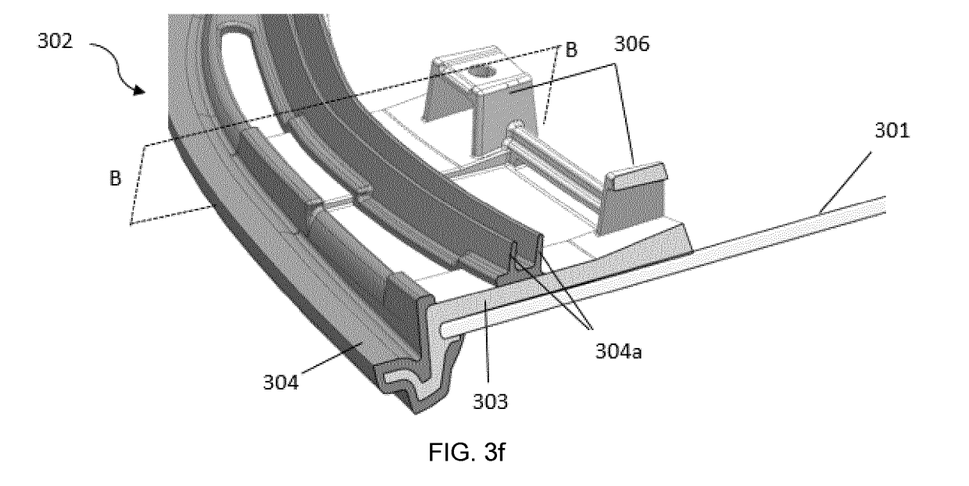
FIG. 3f is a schematic view of the region of the section B-B.

In FIG. 3f, the secondary part is over a part of the primary part and the primary part has fixing means 306 able to fix the window unit to the car body.

In this embodiment, the majority of the primary part is not overmolded by the secondary part. This primary part is hidden by elements of the car body.

The secondary part comprises a lip 304a allowing the thingness between the window unit and the car body C.

In this embodiment, the window unit is produced by a multicomponent injection molding process. This method comprises the following steps:
1. the glass panel is inserted into a mold,
2. the mold is closed creating at least one cavity around the glass panel,
3. The primary part is injected in the at least one cavity,
4. The glass panel with the primary part is transferred on a second part of the mold with a different cavity,
5. The secondary part is injected on the different cavity,
6. The mold is opened,
7. The window unit is removed from the mold.

Figure 4A:
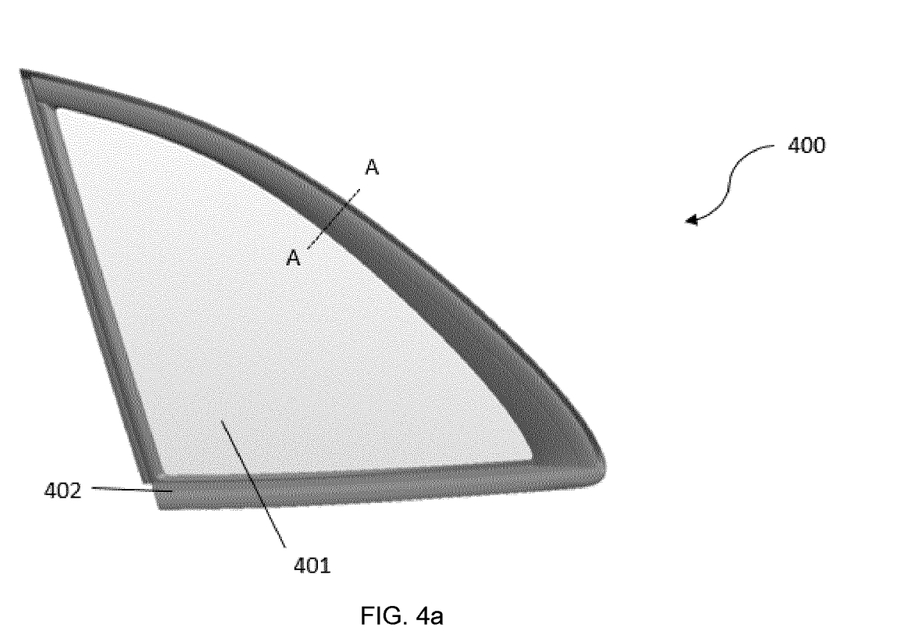
FIG. 4a is a schematic view of a window unit placed in a carbody according to a fourth exemplifying embodiment of the present invention.
Figure 4B:
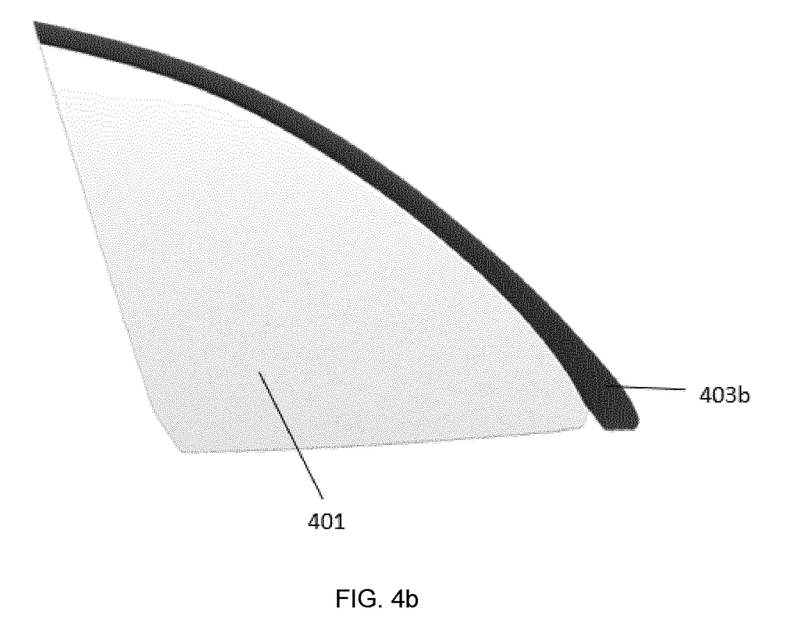
FIG. 4b is a schematic view of the glass panel and the core part of the primary part according to a fourth exemplifying embodiment of the present invention.
Figure 4C:
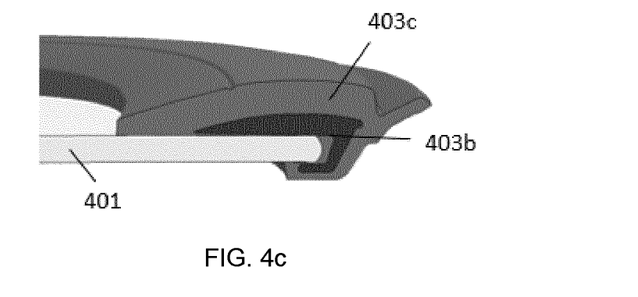
FIG. 4c is a cross section according to FIG. 4a section A-A.

With reference to FIGS. 4a-4c, a first embodiment of the present invention is described.

FIGS. 4a, 4b and 4c show a window unit 400 comprising a glazing panel 401, a frame 402 which has a frame profile and encompasses the edge of the glazing panel 401. The primary part is injected on the glass panel beforehand placed in a mold. Primary part comprises at least 10% in weight of recycled material meaning that the polymeric base of the primary part comprises at least 10% in weight of recycled material of the total polymeric material of the primary part and at most 90% of virgin material. The primary part which is in the form of a soft component comprises a TPE based virgin material. The recycled material is a TPE based material meaning that the recycled material has the same polymeric base than the virgin material of the primary art.

The window unit 400 has a polygonal shape and particularly a triangular-shape. The glazing panel 401 has slightly the same shape. The frame which has a frame profile and encompasses the edge of the glazing panel on the four peripheral sides.

In these embodiments, the primary part comprises at least 50% in weight up to 100% in weight of recycled material. In this embodiment, a percentage of TPE is between 50% in weight and 70% in weight of pre-consumer recycled materials. Advantageously, as the most of the primary part is not visible, the polymeric material of the primary part can have a higher percentage in weight of recycled material.

The primary part can comprises other material such as and glass fibers to reinforce the primary part.

The primary part comprises a core part 403b and a surrounding part 403c.

The core part comprises at least 50% in weight up to 100% in weight of recycled material. The surrounding part has less percentage of recycled material than the core part.

In some embodiments, the primary part can have specific designs in order to fulfil with requirements and to stiffen the frame and the window unit 400. The surrounding part can have a specific design with lips, . . . to tight the window unit 400. As shown in FIGS. 4b-4c, the frame has a frame profile and encompasses the edge of the glazing panel. The primary part encompass the edge of the glazing panel. The primary part is in contact with the two main surfaces of the glazing panel and with the edge. The secondary part is over at least a part of the primary part. In this embodiment, the secondary part is in contact with the glazing panel on one main surface.

In this embodiment, the core part is overmolded with the surrounding part.

The surrounding part encompasses the majority of the surface of the core part. The surrounding part is in direct contact with the glass panel even in the edge of the glass panel.

This core part is hidden by the surrounding part.

In this embodiment, the window unit is produced by an injection molding process. This method comprises the following steps:
1. the glass panel and the core part of the primary part is inserted into a mold,
2. the mold is closed creating at least one cavity around the glass panel and the core part,
3. The surrounding part is injected in the at least one cavity,
4. The mold is opened,
5. The window unit is removed from the mold.

The core part can also be injected on the glass panel. Then the method comprises the following steps:
1. the glass panel is inserted into a mold,
2. the mold is closed creating at least one cavity around the glass panel,
3. The core part is injected in the at least one cavity,
4. The glass panel with the core part is transferred on a second part of the mold with a different cavity,
5. The surrounding part is injected on the different cavity,
6. The mold is opened,
7. The window unit is removed from the mold.

The invention claimed is:
1. A window unit comprising:
a glazing panel, and
a frame,
wherein the frame has a frame profile and encompasses an edge of the glazing panel on at least one peripheral side and comprises a plastic primary part, wherein the primary part comprises at least 10% in weight of a recycled material of the total polymeric material of the primary part, wherein the primary part comprises a core part and a surrounding part, and the surrounding part is placed at least partially over the core part, and wherein a composition of the core part of the primary part comprises a higher rate of recycled material than a composition of the surrounding part.

2. The window unit according to claim 1, wherein the primary part is in the form of a hard component having a young's modulus >1000 MPa.

3. The window unit according to claim 2, wherein the hard component is a polypropylene based material.

4. The window unit according to claim 2, wherein the hard component comprises glass fibers.

5. The window unit according to claim 1, wherein the primary part is in the form of a component that does not have a young's modulus >1000 MPa.

6. The window unit according to claim 5, wherein the frame comprises a secondary part which is in the form of a component that is softer than the primary part, placed at least partially over the primary part.

7. The window unit according to claim 5, wherein the primary part is a thermoplastic elastomer based material or a soft PVC material.

8. The window unit according to claim 1, wherein the primary part is in direct contact with the glazing panel.

9. The window unit according to claim 1, wherein the glazing panel is a glass panel.

10. The window unit according to claim 1, wherein the glazing panel is a laminated glass panel.

11. The window unit according to claim 1, wherein the frame comprises a decorative element, and the decorative element is attached to the primary part of the frame.

12. The window unit according to claim 6, wherein the secondary part is a thermoplastic elastomer based material or a soft PVC material.

13. The window unit according to claim 1, wherein the core part is in contact with first and second main surfaces of the window.

14. The window unit according to claim 13, wherein the secondary part is in contact with at least one of the first and second main surfaces of the window.

15. The window unit according to claim 1, wherein the secondary part surrounds a majority of a surface of the core part.

16. The window unit according to claim 1, wherein the glazing panel is a glass panel.

17. A method to produce the window unit according to claim 1, comprising:
  inserting the glass panel into a mold,
  closing the mold to create at least one cavity around the glass panel,
  injecting the primary part in the at least one cavity,
  opening the mold, and
  removing the window unit from the mold.

18. A method to produce the window unit according to claim 1, comprising:
  inserting the glass panel and the core part into a mold,
  closing the mold to create at least one cavity around the glass panel and/or around the core part,
  injecting the surrounding part of the primary part in the at least one cavity,
  opening the mold, and
  removing the window unit from the mold.

\* \* \* \* \*